(12) United States Patent
Narayanan et al.

(10) Patent No.: US 10,078,455 B2
(45) Date of Patent: Sep. 18, 2018

(54) PREDICTING SOLID STATE DRIVE RELIABILITY

(71) Applicant: Microsoft Technology Licensing, LLC, Redmond, WA (US)

(72) Inventors: Iyswarya Narayanan, State College, PA (US); Di Wang, Redmond, WA (US); Myeongjae Jeon, Seattle, WA (US); Bikash Sharma, Redmond, WA (US); Laura Marie Caulfield, Woodinville, WA (US); Sriram Govindan, Redmond, WA (US); Benjamin Franklin Cutler, Seattle, WA (US); Christopher W. Hoder, Sommerville, MA (US); Jaya Naga Satish Bobba, Bellevue, WA (US); Jie Liu, Medina, WA (US); Badriddine Khessib, Redmond, WA (US)

(*) Notice: Subject to any disclaimer, the term of this patent is extended or adjusted under 35 U.S.C. 154(b) by 0 days.

(21) Appl. No.: 15/002,216

(22) Filed: Jan. 20, 2016

(65) Prior Publication Data
US 2017/0206026 A1 Jul. 20, 2017

(51) Int. Cl.
G06F 3/06 (2006.01)

(52) U.S. Cl.
CPC .......... *G06F 3/0614* (2013.01); *G06F 3/0605* (2013.01); *G06F 3/067* (2013.01);
(Continued)

(58) Field of Classification Search
CPC ..... G06F 3/0614; G06F 3/0631; G06F 3/0683
(Continued)

(56) References Cited

U.S. PATENT DOCUMENTS

| | | |
|---|---|---|
| 6,489,738 B1 | 12/2002 | Bates et al. |
| 6,580,644 B1 | 6/2003 | Chung |
| 8,825,567 B2 | 9/2014 | Jiang et al. |
| 8,953,265 B1 | 2/2015 | Ma |
| 2010/0251039 A1 | 9/2010 | Hirohata et al. |
| 2012/0066449 A1 | 3/2012 | Colgrove et al. |

(Continued)

FOREIGN PATENT DOCUMENTS

| | | |
|---|---|---|
| CN | 101676872 A | 3/2010 |
| WO | 2015042531 A1 | 3/2015 |

OTHER PUBLICATIONS

Meza, et al., "A Large-Scale Study of Flash Memory Failures in the Field", In Proceedings of the ACM SIGMETRICS International Conference on Measurement and Modeling of Computer Systems, Jun. 15, 2015, 14 pages.

(Continued)

*Primary Examiner* — Pierre Miche Bataille
(74) *Attorney, Agent, or Firm* — Ray Quinney & Nebeker, P.C.; Thomas M. Hardman; Stein E. Dolan (57) ABSTRACT

Aspects extend to methods, systems, and computer program products for predicting solid state drive reliability. Aspects of the invention can be used to predict and/or to configure a data center to minimize one or more of: SSD capacity degradation (how much storage an SSD has left), SSD performance degradation (reduced read/write latency/throughput), and SSD failure. Models and data center considerations can be based on device level SSD related operations, such as, for example, read, write, erase. Operations decisions can be made for a data center based on SSD specific features, such as, for example, remaining capacity, write amplification factor, etc. Dependence and/or causality of various different data center factors can be leveraged. The impact of the various data center factors on different SSD failure modes and capacity/performance degradation can be quantified to drive SSD design, SSD provisioning, and SSD operations.

20 Claims, 5 Drawing Sheets

(52) U.S. Cl.
CPC .......... *G06F 3/0616* (2013.01); *G06F 3/0631* (2013.01); *G06F 3/0679* (2013.01); *G06F 3/0683* (2013.01)

(58) Field of Classification Search
USPC .......................................................... 711/170
See application file for complete search history.

(56) References Cited

U.S. PATENT DOCUMENTS

| | | | |
|---|---|---|---|
| 2012/0137066 A1 | 5/2012 | Nolterieke et al. | |
| 2012/0203951 A1* | 8/2012 | Wood .................... | G11C 16/28 711/102 |
| 2014/0258775 A1* | 9/2014 | Flynn .................... | G06F 11/073 714/6.21 |
| 2014/0298113 A1 | 10/2014 | Sakurai et al. | |
| 2015/0261455 A1 | 9/2015 | Gough et al. | |
| 2017/0046097 A1* | 2/2017 | Jayaraman ............ | G06F 3/0629 |
| 2017/0084344 A1* | 3/2017 | Choi .................... | G11C 11/5628 |

OTHER PUBLICATIONS

Sankar, et al., "Datacenter Scale Evaluation of the Impact of Temperature on Hard Disk Drive Failures", In Journal of ACM Transactions on Storage, vol. 9, Issue 2, Jul. 2013, 26 pages.

Pinheiro, et al., "Failure Trends in a Large Disk Drive Population", In Proceedings of the 5th USENIX Conference on File and Storage Technologies, Feb. 2007, 13 pages.

El-Sayed, et al., "Temperature Management in Data Centers: Why Some (Might) Like It Hot", In Proceedings of the 12th ACM Sigmetrics/Performance joint international conference on Measurement and Modeling of Computer Systems, Jun. 11, 2012, pp. 163-174.

Harris, Robin, "Facebook's SSD Findings: Failure, Fatigue and the Data Center", Published on: Jun. 12, 2015 Available at: http://www.zdnet.com/article/facebooks-ssd-experience/.

Miroshnichenko, Michael, "Predicting SSD Failures:Specific S.M.A.R.T. Values", Published on: Dec. 5, 2012 Available at: http://hetmanrecovery.com/recovery_news/predicting-ssd-failures-ssd-specific-smart-values.htm.

Chu, Wallace, "Symptoms of Impending Ssd/Hard Drive Failure, and What to Do", Published on: Mar. 17, 2015 Available at: http://blog.neweggbusiness.com/over-easy/symptoms-of-impending-ssd-hard-drive-failure-and-what-to-do/.

Mearian, Lucas, "SSDs do die, as Linus Torvalds just discovered", Published on: Sep. 12, 2013 Available at: http://www.computerworld.com/article/2484998/solid-state-drives/ssds-do-die-as-linus-torvalds-just-discovered.html.

"International Search Report and Written Opinion Issued in PCT Application No. PCT/US2017/013581", dated May 4, 2017, 11 Pages.

* cited by examiner

PREDICTING SOLID STATE DRIVE RELIABILITY

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

In many environments, computer systems include some type of more durable storage, such as, for example, Solid State Drives (SSDs) and/or Hard Disk Drives (HDDs). Due to performance, SSDs are becoming more prominent and are replacing HDDs for many applications. For example, use of SSDs in storage subsystem of data centers is increasing.

Though read and write operations in SSDs are similar to other storage technologies, read and write operations in SSDs are atypical. Since there are no writes in-place, pages have to be written on to erased blocks, thus invalidating their older versions (garbage). Live data has to be copied out of the existing blocks and moved elsewhere. Consequently, SSD incurs extra writes beyond those directed by the host.

As such, SSDs can exhibit unique behavior relative to other types of storage devices, including write-amplification, read disturbance, media wear-out, etc. These unique behaviors can lead to capacity degradation, performance loss, and may even result in premature failure of an SSD.

In data centers, a number of factors, such as, for example, workload, facility environment, hardware design, policies, etc. can also impact SSD performance. Thus, SSD reliability can depend not only on SSD device level factors but also on other factors at higher levels in a data center hierarchy. Moreover, these other factors can interact in non-trivial ways resulting in capacity degradation, performance degradation, or failure of SSDs.

Various different techniques have been used to consider some aspects of data center performance and reliability. Some techniques have been used for server failure prediction based on temperature and voltage abnormality events in the context of active/standby redundant computer systems. Other techniques have been used for system level balancing of reliability and performance by reconfiguring RAID levels are different data processing phases. Further techniques have been used to consider the impact of temperature impact on HDDs failures and DRAM errors.

However, none of these techniques consider the performance and reliability of SSDs in view of unique SSD behaviors. Further, none of these techniques consider how other factors in a data center can impact the performance and reliability of SSDs within the data center.

BRIEF SUMMARY

Examples extend to methods, systems, and computer program products for predicting solid state drive reliability.

A Solid State Drive (SSD) configuration for a data center is received. The Solid State Drive (SSD) configuration is for configuring one or more Solid State Drives (SSDs) within the data center.

One or more Solid State Drive (SSD) multi-factor models are accessed. Each of the one or more Solid State Drive (SSD) multi-factor models indicates a relationship between each of a plurality of factors and Solid State Drive (SSD) functionality. Each relationship quantifies a causal impact of a factor on Solid State Drive (SSD) functionality. At least one Solid State Drive (SSD) multi-factor model indicates the impact of a latent variable on Solid State Drive (SSD) functionality. Each of the one or more Solid State Drive (SSD) multi-factor models derived from prior monitoring of data center factors and Solid State Drive (SSD) functionality within one or more data center environments.

At least one relevant Solid State Drive (SSD) multi-factor model, from among one or more Solid State Drive (SSD) multi-factor models, is referred to. The at least one relevant Solid State Drive (SSD) multi-factor model is relevant to the Solid State Drive (SSD) configuration. It is determined how to optimize the one or more Solid State Drives (SSDs) within the data center by applying the at least one relevant Solid State Drive (SSD) multi-factor model to the Solid State Drive (SSD) configuration based on data center factors for the data center.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Examples extend to methods, systems, and computer program products for predicting solid state drive reliability.

A Solid State Drive (SSD) configuration for a data center is received. The Solid State Drive (SSD) configuration is for configuring one or more Solid State Drives (SSDs) within the data center.

One or more Solid State Drive (SSD) multi-factor models are accessed. Each of the one or more Solid State Drive (SSD) multi-factor models indicates a relationship between each of a plurality of factors and Solid State Drive (SSD) functionality. Each relationship quantifies a causal impact of a factor on Solid State Drive (SSD) functionality. At least one Solid State Drive (SSD) multi-factor model indicates the impact of a latent variable on Solid State Drive (SSD) functionality. Each of the one or more Solid State Drive (SSD) multi-factor models derived from prior monitoring of data center factors and Solid State Drive (SSD) functionality within one or more data center environments.

At least one relevant Solid State Drive (SSD) multi-factor model, from among one or more Solid State Drive (SSD) multi-factor models, is referred to. The at least one relevant Solid State Drive (SSD) multi-factor model is relevant to the Solid State Drive (SSD) configuration. It is determined how to optimize the one or more Solid State Drives (SSDs) within the data center by applying the at least one relevant Solid State Drive (SSD) multi-factor model to the Solid State Drive (SSD) configuration based on data center factors for the data center.

Implementations may comprise or utilize a special purpose or general-purpose computer including computer hardware, such as, for example, one or more processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, pagers, watches, fitness monitors, eye glasses, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In one aspect, resources within a data center (e.g., compute, storage, and networking resources) are allocated for use by others, such as, for example, to create a "cloud".

In this description and the following claims, a "Solid State Drive" is defined as a solid state storage device that uses integrated circuit assemblies as memory to store data. Solid State Drives can use NAND-based flash memory that retains data when power is lost. Solid State Drives can also use RAM for applications where data persistence is less important. Accordingly, Solid State Drive storage can be persistent (i.e., data remains stored when power is on or off) or non-persistent (i.e., data remains stored when power is on). Solid State Drive technology can use electronic interfaces compatible with block input/output (I/O) hard disk drives, which permit simple replacements in common applications (e.g., a computer system or data center). Solid State Drives can also be referred to as Solid State Disks or "SSDs".

In this description and in the following claims, a "latent variable" is defined as a variable that is not directly observed or measured. Existence of a latent variable can be inferred from other variables that are directly observed or measured.

Aspects of the invention include a multi-factor framework to assist with provisioning, design, and operational decisions in data centers for optimizing SSD reliability. Using models, relationships between data center design, operation and provisional factors, and SSD failures, SSD performance degradation, and SSD capacity degradation can be identified. Models can be developed to quantify the causal/ dependency impact of design, operation and provisional factors on SSD failures, SSD performance degradation, and SSD capacity degradation. The models can be used to predict unique SSD functionalities, such as, for example, any of: SSD failures, SSD performance degradation, and SSD capacity degradation, within a data center environment.

Figure 1:
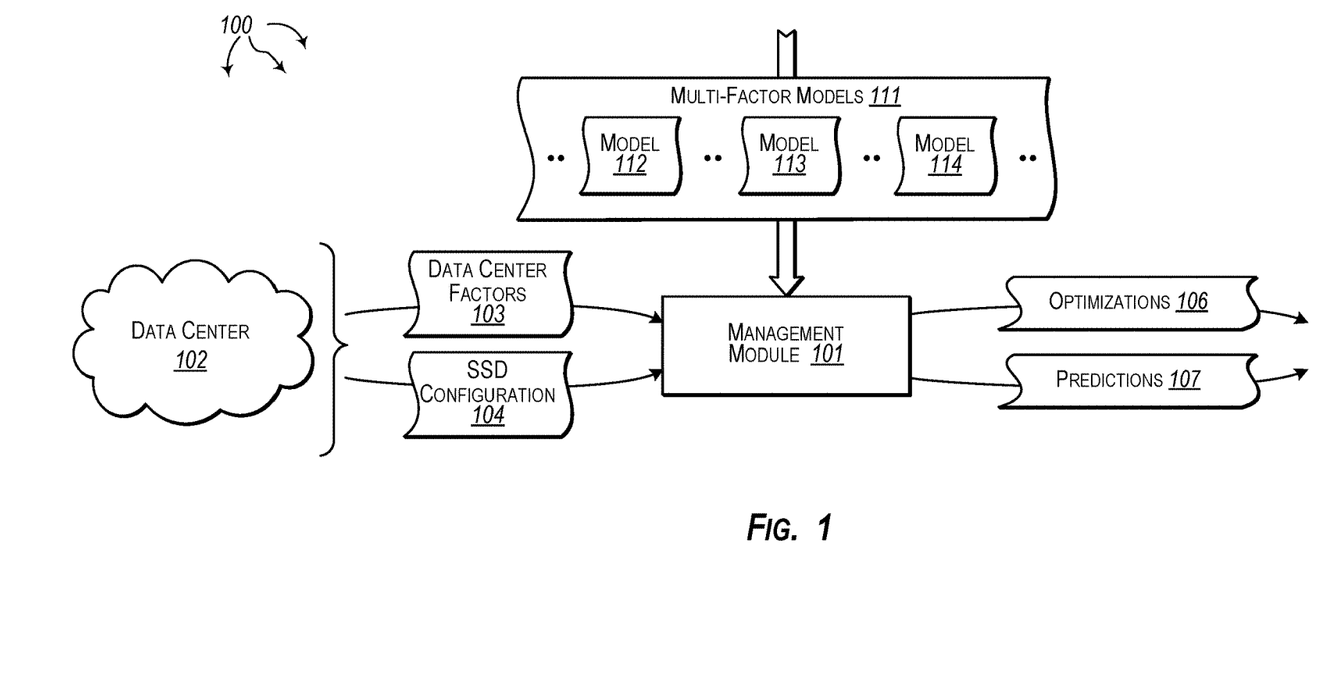
FIG. 1 illustrates an example architecture that facilitates predicting Solid State Drive (SSD) reliability.

FIG. 1 illustrates an example computer architecture 100 that facilitates predicting solid state drive reliability. Referring to FIG. 1, computer architecture 100 includes management module 101. Management module 101 can be connected to (or be part of) a network, such as, for example, a Local Area Network ("LAN"), a Wide Area Network ("WAN"), and even the Internet. Accordingly, management module 101 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, management module 101 is configured to utilize identified relationships between one or more of: design, operational, and provisioning features and one or more of: SSD failures, SSD performance degradation, and SSD capacity degradation to optimize and predict SSD performance (e.g., within a data center). Management module 101 can quantify the dependency and/or causal impact of design, operational, and provisioning features on SSD failures, SSD performance degradation, and SSD capacity degradation in the presence or absence of latent variables. Management module 101 can also predict SSD failures, SSD performance degradation, and SSD capacity degradation based on one or more of: design, operational, and provisioning features.

In one aspect, management module 101 receives (proposed or actual) data center factors for a data center and a (proposed or actual) SSD configuration for the data center. Data center factors and SSD configuration can be for an operating data center or can be hypothetical, such as, for a data center that is under design. As such, aspects of the invention can be used to predict SSD reliability during any of design, provisioning, and operational stages of a data center. In view of a predicted SSD reliability, design, provisioning, and operational changes can be made to a data center to optimize SSD reliability.

Data center factors can include any of: facility features, hardware features, device features, workload features, environmental features, policy features, and reliability features for the data center. Facility features can include information about a facility in which a device resides (e.g., a datacenter). Facility features can include properties of the facility including but not limited to the date center location, cooling design, power system, packaging technology, etc.

Hardware features can include any of a multitude of hardware related features including but not limited to server and rack configuration, hardware configuration (SKU), SSD model, SSD vendor, server power rating, SSD age, etc. Device features can include multiple device level counters including but not limited to SMART attributes that keeps track of device access patterns, reads, writes, power cycles, data errors, etc. at various granularities in time. Workload features can include various workload related features including but not limited to workload categories, workload performance, workload latency and/or throughput, and utilization of different components captured at various granularities in time.

Environmental features include properties of the local environment including but not limited to temperature, relative humidity, pressure, altitude, etc. captured at different granularities in time across various devices, racks, and datacenters. Policy features including management policies of the datacenter including but not limited to number of power cycles, reboots, reimaging, upgrades, and updates. Reliability features include related information that identify a specific failed device and capture information pertaining to failure, and the date and time of failure.

Management module 101 accesses one or more multi-factor models to optimize and/or predict SSD reliability at the data center. The multi-factor models can be formulated by modeling SSD reliability in other data centers in view of data center factors for the other data centers. Multi-factor models can include any of: a multi-factor dependency and causal model, a multi-factor design decision support model, a multi-factor provisioning support model, a multi-factor operation support model, and a predictive model.

Figure 2:
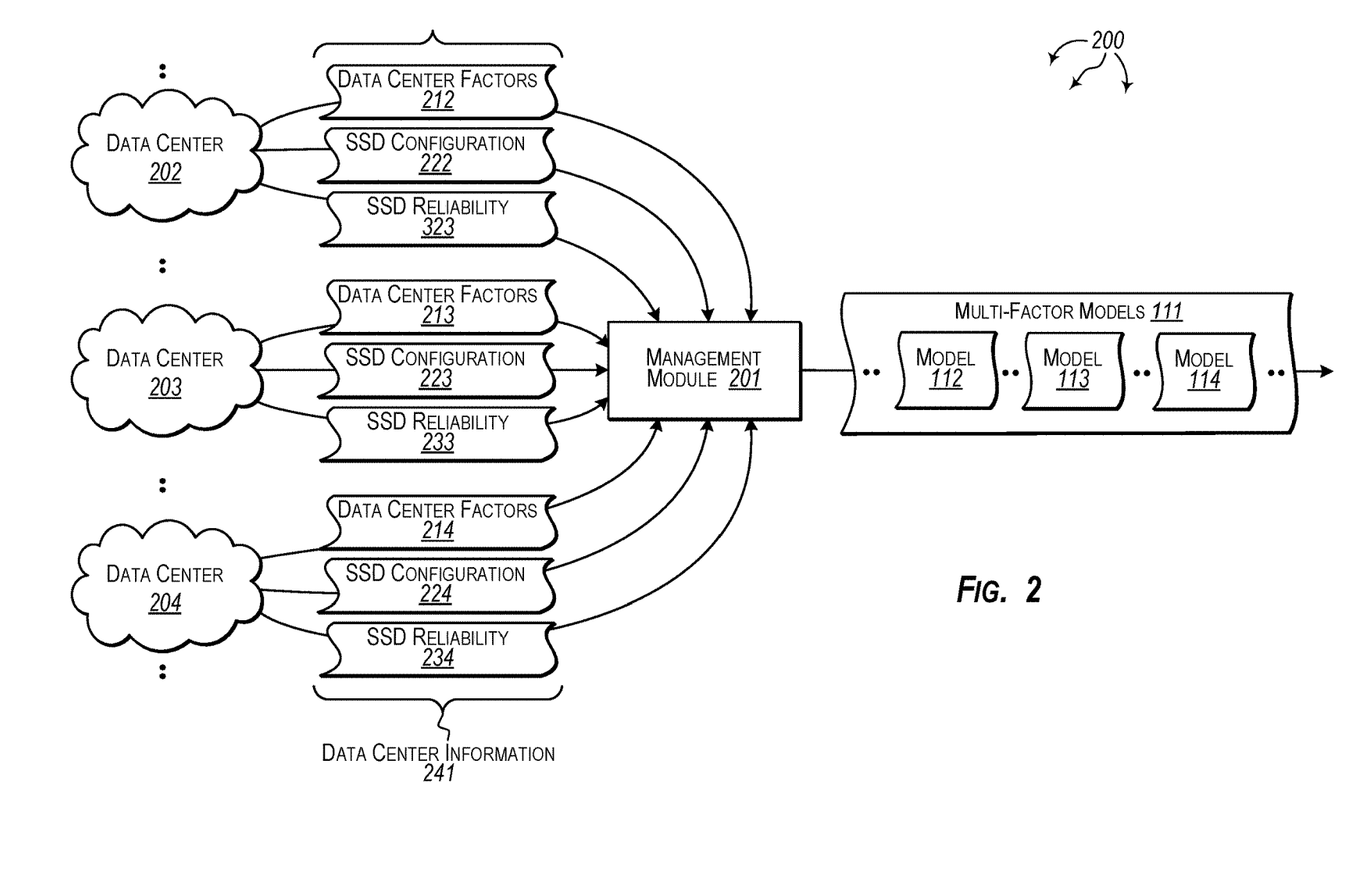
FIG. 2 illustrates an example architecture that facilitates formulating multi-factor models for use in predicting State Drive (SSD) reliability.

Turning to FIG. 2, FIG. 2 illustrates an example computer architecture 200 that facilitates formulating multi-factor models for use in predicting State Drive (SSD) reliability. Referring to FIG. 2, computer architecture 200 includes modeling module 201. Modeling module 201 can be connected to (or be part of) a network, such as, for example, a Local Area Network ("LAN"), a Wide Area Network ("WAN"), and even the Internet. Accordingly, modeling module 201 as well as any other connected computer systems and their components (e.g., management module 101), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, modeling module 201 can formulate multi-factor models 111 from data associated with data centers 202, 203, 204, etc. For example, modeling module 201 can access data center information 241 from data centers 202, 203, 204, etc. Data center information 241 includes data center factors 212, SSD configuration 222, and SSD reliability 213 for data center 202. Similarly, data center information 241 includes data center factors 213, SSD configuration 223, and SSD reliability 223 for data center 203. Likewise, data center information 241 includes data center factors 214, SSD configuration 224, and SSD reliability 224 for data center 204.

Modeling module 201 can model multi-factor models 111 from data center information 241. As depicted, multi-factor models 111 includes models 112, 113, 114, etc. Each of models 112, 113, 114, etc. can be one of a: multi-factor dependency and causal model, a multi-factor design decision support model, a multi-factor provisioning support model, a multi-factor operation support model, a predictive model.

A multi-factor dependency and causal model can capture the dependency and/or causal structure of multiple SSD features and their relative importance in affecting SSD reliability, SSD performance degradation, and SSD capacity degradation. A multi-factor design decision support model quantifies the impact of design factors affecting SSD reliability, SSD performance degradation, and SSD capacity degradations. A multi-factor provisioning support model quantifies the impact of provisioning factors affecting SSD reliability, SSD performance degradation, and SSD capacity degradations.

A multi-factor operational support model quantifies the impact of operational factors, such as workload access patterns, datacenter environment settings, etc., affecting SSD reliability, SSD performance degradation, and SSD capacity degradations. A predictive model predicts when failures/degradations may happen. Predictive modules can predict failures/degradations for adapting control and maintenance decisions based on different SSD operational states.

Multi-factor models 111 can be used to optimize SSD configuration and predict SSD reliability. Optimizing SSD configuration and/or predicting SSD reliability can include using multi-factor models 111 to resolve various design, provisioning and operational related considerations. For example, multi-factor modules 111 can be used to identify factors influencing SSD performance, identify dependencies among the identified factors, determine direction or dependence, and determine the effect of the dependence on SSD reliability metrics.

Multi-factor models 111 can also be used to determine if a colocation or ITPAC configuration is better and if HVAC or adiabatic cooling better. Multi-factor models 111 can also be used to determine the impact of change SSD location within a server (e.g., within a blade) and if SSDs should be placed closer to a hot aisle or cold aisle, or in between. Multi-factor models 111 can also be used to determine how to allocate SSDs by size, for example, is 2×240 GB better than 1×480 GB. Multi-factor models 111 can also be used to determine if newer or older generation SSDs are better, which model/vendor of SSD to buy, how to control SSD access/usage patterns to improve reliability, and how to control operation environment to improve SSD reliability. Multi-factor models 111 can also be used to predict SSD failures and determine how early before failure actually occurs failure can be predicted.

Returning back to FIG. 1, management module 101 can utilize multi-factor models 111 to optimize SSD configuration and/or predict SSD reliability for data center 102. Optimizing SSD configuration and/or predicting SSD reliability can include to resolving various design, provisioning and operational related considerations for data center 102 based on multi-factor models 111.

Figure 3:
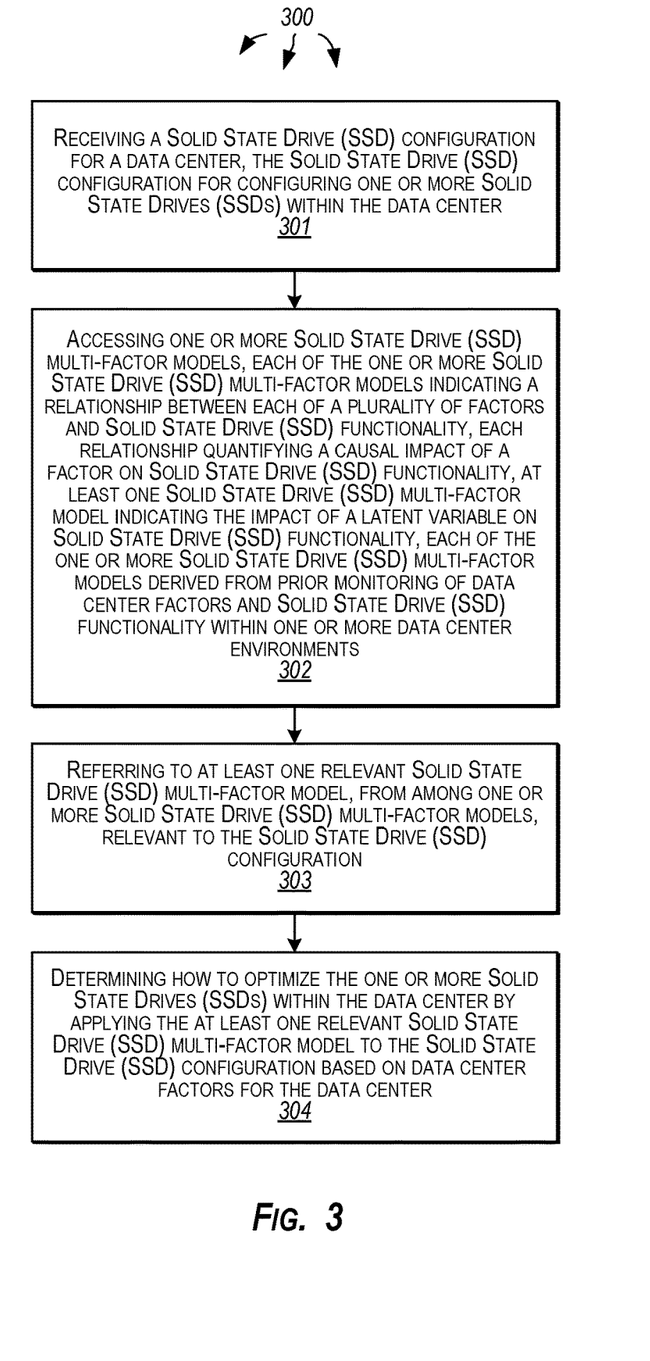
FIG. 3 illustrates a flow chart of an example method for predicting Solid State Drive (SSD) reliability.

FIG. 3 illustrates a flow chart of an example method for predicting solid state drive reliability. Method 300 will be described with respect to the components and data of computer architecture 100.

Method 300 includes receiving a Solid State Drive (SSD) configuration for a data center, the Solid State Drive (SSD) configuration for configuring one or more Solid State Drives (SSDs) within the data center (301). For example, management module 101 can access SSD configuration 104 for data center 102. Configuration 104 can be an actual or proposed (e.g., hypothetical) SSD configuration for data center 102. SSD configuration 104 can be accessed by traversing the configuration of data center 102 or from a configuration file or database.

Management module 101 can also access data center factors 103. Data center factors 103 can be actual or proposed (e.g., hypothetical) features for data center 102, such as, for example, one or more of: facility features, hardware features, device features, workload features, environmental features, policy features, and reliability features.

Method 300 includes accessing one or more Solid State Drive (SSD) multi-factor models, each of the one or more Solid State Drive (SSD) multi-factor models indicating a relationship between each of a plurality of factors and Solid State Drive (SSD) functionality, each relationship quantifying a causal impact of a factor on Solid State Drive (SSD) functionality, at least one Solid State Drive (SSD) multi-factor model indicating the impact of a latent variable on Solid State Drive (SSD) functionality, each of the one or more Solid State Drive (SSD) multi-factor models derived from prior monitoring of data center factors and Solid State Drive (SSD) functionality within one or more data center environments (302). For example, management module 101 can access multi-factor models 111. As described, each of models 112, 113, 114, etc., models a relationship between a plurality of data center factors and SSD functionality. Each relationship quantifies a causal impact of a factor on SSD functionality. At least one of models 112, 113, 114, etc., indicates the impact of a latent variable on SSD functionality. As described, each of models 112, 113, 114, etc., are derived from data center information 241, which can include monitoring of data centers 202, 203, 204, etc.

Method 300 includes referring to at least one relevant Solid State Drive (SSD) multi-factor model, from among one or more Solid State Drive (SSD) multi-factor models, relevant to the Solid State Drive (SSD) configuration (303). For example, management module 101 can refer to model 112 that is relevant to SSD configuration 104.

Method 300 includes determining how to optimize the one or more Solid State Drives (SSDs) within the data center by applying the at least one relevant Solid State Drive (SSD) multi-factor model to the Solid State Drive (SSD) configuration based on data center factors for the data center (304). For example, management module 101 can determine how to optimize SSDs in data center 102 by applying model 112 to SSD configuration 104 based on data center factors 104. In one aspect, management module 101 can predict one or more of: a probability of Solid State Drive (SSD) failure, a probability of Solid State Drive (SSD) capacity degradation, and a probability of Solid State Drive (SSD) performance degradation for one or more Solid State Drives (SSDs) over a specified period of time operating within data center 102.

Figure 4:
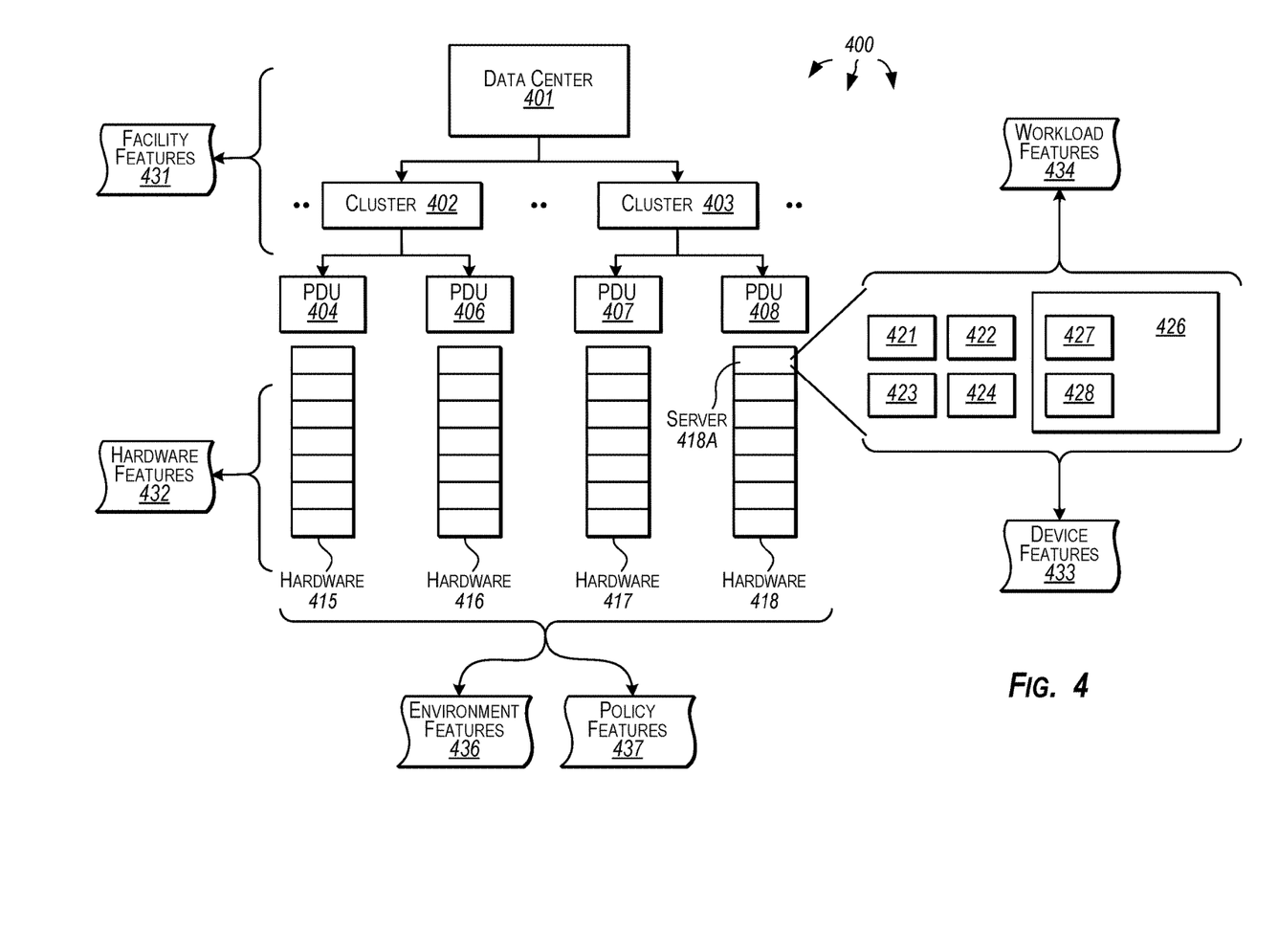
FIG. 4 illustrates an example architecture that facilitates identifying factors of a data center.

Turning to FIG. 4, FIG. 4 illustrates an example architecture 400 that facilitates identifying factors of a data center. As depicted, computer architecture 400 includes data center 401, which includes clusters 402, 403, etc. Each cluster includes corresponding power distribution units (PDUs) and hardware (e.g., computer, storage and, networking resources). For example, cluster 402 includes PDUs 404 and 406 and corresponding hardware 414 and 416. Likewise, cluster 403 includes PDUs 407 and 408 and corresponding hardware 417 and 418.

Each hardware component can include one or more subcomponents. For example, server 418A can include storage components 421, 422, 423, and 424 (some of which may be SSDs) and processor board 426. Processor board 426 can further include processors 427 and 428. Other server configurations are also possible.

Data center factors (e.g., similar to data factors 103) can be derived for data center 401. Data center factors can be include any of the types of described features. For example, facility features 431 can be derived for data center 401 and clusters 402, 403, etc. Hardware features 432 can be derived for hardware 414, 416, 417, and 418. Environment features 436 and policy features 437 can be derived for data center 401. Workload and device features can also be derived for components in hardware 414, 416, 417, and 418. For example, device features 433 can be derived for storage devices 421, 422, 423, and 424, and processors 427 and 428. Workload features can be derived for storage devices 421, 422, 423, and 424, processor board 426, and processors 427 and 428.

A module, such as, for example, management module 101 or modeling module 201 can access factors for computer architecture 400. For example, management module 101 can access any of facility features 431, hardware features 432, device features 433, workload features 434, environment features 436, and policy features 437 to determine SSD optimizations and/or to predict SSD failures for data center 401. Modeling module 201 can access any of facility features 431, hardware features 432, device features 433, workload features 434, environment features 436, and policy features 437 to formulate a multi-factor model.

Figure 5:
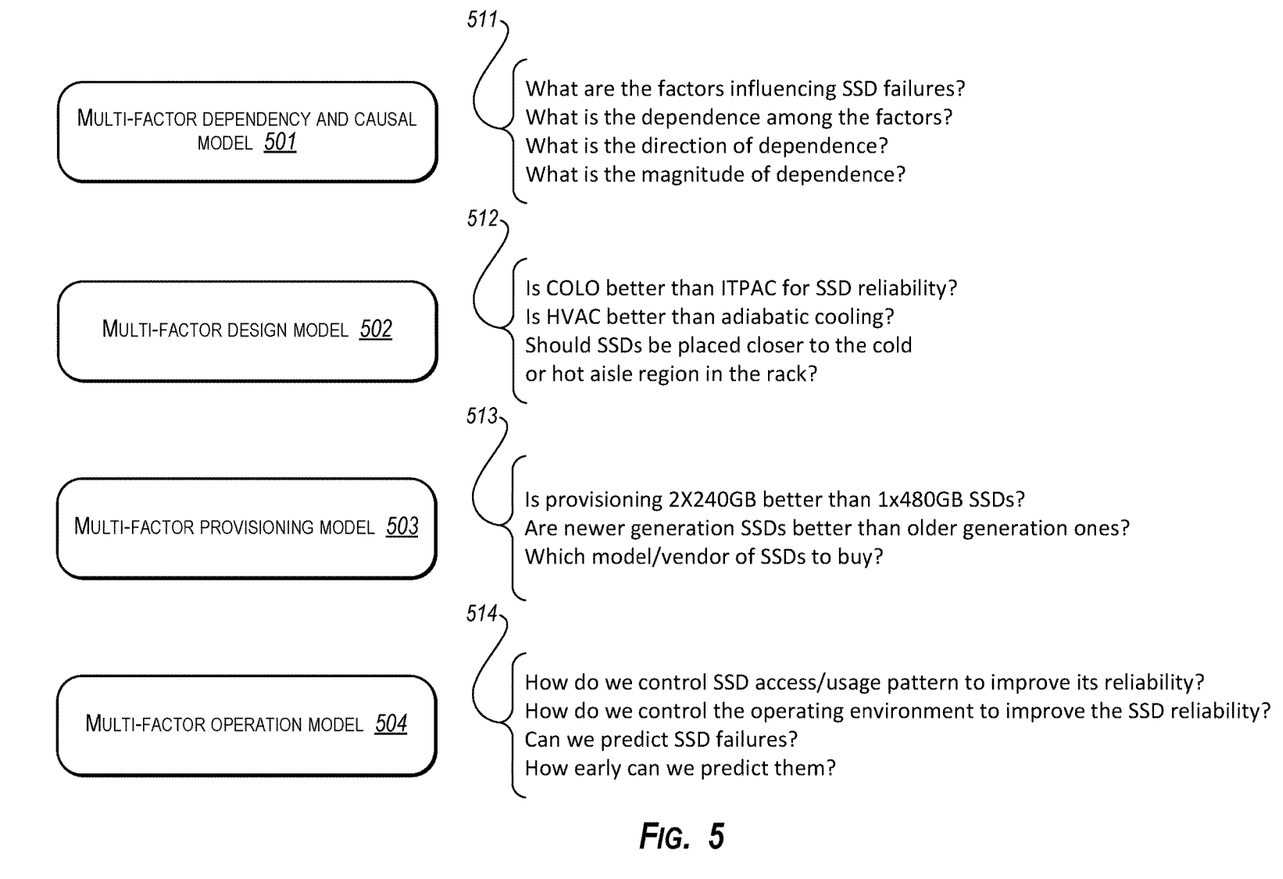
FIG. 5 illustrates an example of multi-factor models and data center considerations.

FIG. 5 illustrates an example of multi-factor models and data center decisions. As depicted, FIG. 5 includes multi-factor dependency and causal model 501, multi-factor design model 502, multi-factor provisioning model 503, and multi-factor operation model 504. A modeling module (e.g., modeling module 201) can formulate of multi-factor dependency and causal model 501, multi-factor design model 502, multi-factor provisioning model 503, and multi-factor operation model 504 from one or more of facility features 431, hardware features 432, device features 433, workload features 434, environment features 436, and policy features 437.

Multi-factor dependency and causal model 501 can be used to assist with data center considerations 511. Multi-factor design model 502 can be used to assist with data center considerations 512. Multi-factor provisioning model 503 can be used to assist with data center considerations 513. Multi-factor operation model 504 can be used to assist with data center considerations 514.

Accordingly, aspects of the invention can be used to predict and/or to configure a data center to minimize one or more of: SSD capacity degradation (how much storage an SSD has left), SSD performance degradation (reduced read/write latency/throughput), and SSD failure. Models and data center considerations can be based on device level SSD related operations, such as, for example, read, write, erase. Operations decisions can be made for a data center based on SSD specific features, such as, for example, remaining capacity, write amplification factor, etc. Dependence and/or causality of various different data center factors can be leveraged. The impact of the various data center factors on different SSD failure modes and capacity/performance degradation can be quantified to drive SSD design, SSD provisioning, and SSD operations.

In one aspect, a system includes a processor, system memory, storage resources, and a management module. The management module can use the processor to receive a Solid State Drive (SSD) configuration for a data center. The Solid State Drive (SSD) configuration is for configuring one or more Solid State Drives (SSDs) within the data center.

The management module can use the processor to access one or more Solid State Drive (SSD) multi-factor models. Each of the one or more Solid State Drive (SSD) multi-factor models indicates a relationship between each of a plurality of factors and Solid State Drive (SSD) functionality. Each relationship quantifies a causal impact of a factor on Solid State Drive (SSD) functionality. At least one Solid State Drive (SSD) multi-factor model indicates the impact of a latent variable on Solid State Drive (SSD) functionality. Each of the one or more Solid State Drive (SSD) multi-factor models is derived from prior monitoring of data center factors and Solid State Drive (SSD) functionality within one or more data center environments.

The management module can use the processor to refer to at least one relevant Solid State Drive (SSD) multi-factor model, from among one or more Solid State Drive (SSD) multi-factor models, relevant to the Solid State Drive (SSD) configuration. The management module can use the processor to determine how to optimize the one or more Solid State Drives (SSDs) within the data center by applying the at least one relevant Solid State Drive (SSD) multi-factor model to the Solid State Drive (SSD) configuration based on data center factors for the data center.

In another aspect, a method for predicting solid state drive reliability is performed. A Solid State Drive (SSD) configuration is received for a data center. The Solid State Drive (SSD) configuration is for configuring one or more Solid State Drives (SSDs) within the data center.

One or more Solid State Drive (SSD) multi-factor models are accessed. Each of the one or more Solid State Drive (SSD) multi-factor models indicates a relationship between each of a plurality of factors and Solid State Drive (SSD) functionality. Each relationship quantifies a causal impact of a factor on Solid State Drive (SSD) functionality. At least one Solid State Drive (SSD) multi-factor model indicates the impact of a latent variable on Solid State Drive (SSD) functionality. Each of the one or more Solid State Drive (SSD) multi-factor models is derived from prior monitoring of data center factors and Solid State Drive (SSD) functionality within one or more data center environments.

At least one relevant Solid State Drive (SSD) multi-factor model, from among one or more Solid State Drive (SSD) multi-factor models, is referred to. The at least one relevant Solid State Drive (SSD) multi-factor model is relevant to the Solid State Drive (SSD) configuration. It is determined how to optimize the one or more Solid State Drives (SSDs) within the data center by applying the at least one relevant Solid State Drive (SSD) multi-factor model to the Solid State Drive (SSD) configuration based on data center factors for the data center.

In a further aspect, a computer program product for use at a computer system includes one or more computer storage devices having stored thereon computer-executable instructions that, in response to execution at a processor, cause the computer system to implement a method for predicting solid state drive reliability.

The computer program product includes computer-executable instructions that, in response to execution at a processor, cause the computer system to receive a Solid State Drive (SSD) configuration for a data center. The Solid State Drive (SSD) configuration is for configuring one or more Solid State Drives (SSDs) within the data center.

The computer program product includes computer-executable instructions that, in response to execution at a processor, cause the computer system to access one or more Solid State Drive (SSD) multi-factor models. Each of the one or more Solid State Drive (SSD) multi-factor models indicates a relationship between each of a plurality of factors and Solid State Drive (SSD) functionality. Each relationship quantifies a causal impact of a factor on Solid State Drive (SSD) functionality. At least one Solid State Drive (SSD) multi-factor model indicates the impact of a latent variable on Solid State Drive (SSD) functionality. Each of the one or more Solid State Drive (SSD) multi-factor models is derived from prior monitoring of data center factors and Solid State Drive (SSD) functionality within one or more data center environments.

The computer program product includes computer-executable instructions that, in response to execution at a processor, cause the computer system to refer to at least one relevant Solid State Drive (SSD) multi-factor model, from among one or more Solid State Drive (SSD) multi-factor models, relevant to the Solid State Drive (SSD) configuration. The computer program product includes computer-executable instructions that, in response to execution at a processor, cause the computer system to determine how to optimize the one or more Solid State Drives (SSDs) within the data center by applying the at least one relevant Solid State Drive (SSD) multi-factor model to the Solid State Drive (SSD) configuration based on data center factors for the data center.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
    receiving a Solid State Drive (SSD) configuration indicating the configuration of one or more Solid State Drives (SSDs) within a data center;
    observing a plurality of factors related to Solid State Drive (SSD) functionality in another data center;
    deriving a relationship between each of a plurality of observed factors and the Solid State Drive (SSD) configuration, each relationship quantifying a causal impact on Solid State Drive (SSD) reliability;
    inferring existence of at least one unobserved latent variable related to Solid State Drive (SSD) functionality based on the observed plurality of factors;
    deriving an additional relationship between the unobserved latent variable and the Solid State Drive (SSD) configuration quantifying an additional causal impact on Solid State Drive (SSD) reliability;
    determining a Solid State Drive (SSD) optimization based on the Solid State Drive (SSD) configuration, data center factors for the data center, the derived relationships, and the derived additional relationship; and
    applying the optimization to the one or more Solid State Drives (SSDs) to optimize Solid State Drive (SSD) reliability at the data center.

2. The method of claim 1, wherein receiving a Solid State Drive (SSD) configuration comprises receiving a hypothetical Solid State Drive (SSD) configuration for a data center.

3. The method of claim 1, wherein deriving a relationship between each of a plurality of observed factors and Solid State Drive (SSD) configuration comprises deriving a relationship between two or more of: a multi-factor Solid State Drive (SSD) dependency model, a multi-factor Solid State Drive (SSD) design support model, a multi-factor Solid State Drive (SSD) provisioning support model, and a multi-factor Solid State Drive (SSD) operational support model, and Solid State Drive (SSD) functionality.

4. The method of claim 1, wherein deriving a relationship between each of a plurality of observed factors and Solid State Drive (SSD) configuration comprises deriving a relationship between two or more of: Solid State Drive (SSD) failure symptoms, Solid State Drive (SSD) capacity degradation, Solid State Drive (SSD) performance degradation, and Solid State Drive (SSD) failure, and Solid State Drive (SSD) functionality.

5. The method of claim 1, wherein deriving a relationship between each of a plurality of observed factors and Solid State Drive (SSD) configuration comprises deriving a relationship between two or more of: facility features of a physical facility for the data center, hardware features of hardware that is to interoperate with the one or more Solid State Drives (SSDs) within the data center, device features for the one or more Solid State Drives (SSDs), workload features of workloads using the one or more Solid State Drives (SSDs), environmental features of the environment within the data center, and policy features of management policies associated with the data center, and Solid State Drives (SSD) functionality.

6. The method of claim 1, wherein determining a Solid State Drive (SSD) optimization comprises predicting one or more of: a probability of Solid State Drive (SSD) failure, a probability of Solid State Drive (SSD) capacity degradation, and a probability of Solid State Drive (SSD) performance degradation for the one or more Solid State Drives (SSDs) over a specified period of time operating within the data center.

7. The method of claim 1, wherein determining a Solid State Drive (SSD) optimization comprises determining an optimization for one or more of: a design decision for the one or more Solid State Drives (SSDs), a provisioning decision for the one or more Solid State Drives (SSDs), and an operational decision for the one or more Solid State Drives (SSDs).

8. The method of claim 1, wherein determining a Solid State Drive (SSD) optimization comprises determining an optimization for one or more of: lifetime for the one or more Solid State Drives (SSDs), reliability for the one or more Solid State Drives (SSDs), capacity degradation rate for the one or more Solid State Drives (SSDs), and operating performance for the one or more Solid State Drives (SSDs).

9. A system, the system comprising:
one or more hardware processors;
system memory coupled to the one or more hardware processors, the system memory storing instructions that are executable by the one or more processors;
the one or more processors executing the instructions stored in the system memory to perform the following:
receive a Solid State Drive (SSD) configuration indicating the configuration of one or more Solid State Drives (SSDs) within a data center;
observe a plurality of factors related to Solid State Drive (SSD) functionality in another data center;
derive a relationship between each of a plurality of observed factors and the Solid State Drive (SSD) configuration, each relationship quantifying a causal impact on Solid State Drive (SSD) reliability;
infer existence of at least one unobserved latent variable related to Solid State Drive (SSD) functionality based on the observed plurality of factors;
derive an additional relationship between the unobserved latent variable and the Solid State Drive (SSD) configuration quantifying an additional causal impact on Solid State Drive (SSD) reliability;
determine a Solid State Drive (SSD) optimization based on the Solid State Drive (SSD) configuration, data center factors for the data center, the derived relationships, and the derived additional relationship; and
apply the optimization to the one or more Solid State Drives (SSDs) to optimize Solid State Drive (SSD) reliability at the data center.

10. The system of claim 9, wherein the one or more processors executing the instructions stored in the system memory to receive a Solid State Drive (SSD) configuration comprises the one or more processors executing the instructions stored in the system memory to receive a hypothetical Solid State Drive (SSD) configuration.

11. The system of claim 9, wherein the one or more processors executing the instructions stored in the system memory to derive a relationship between each of a plurality of observed factors and Solid State Drive (SSD) configuration comprises the one or more processors executing the instructions stored in the system memory to derive a relationship between two or more of: a multi-factor Solid State Drive (SSD) dependency model, a multi-factor Solid State Drive (SSD) design support model, a multi-factor Solid State Drive (SSD) provisioning support model, and a multi-factor Solid State Drive (SSD) operational support model, and Solid State Drive (SSD) functionality.

12. The system of claim 9, wherein the one or more processors executing the instructions stored in the system memory to derive a relationship between each of a plurality of observed factors and Solid State Drive (SSD) configuration comprises the one or more processors executing the instructions stored in the system memory to derive a relationship between two or more of: Solid State Drive (SSD) failure symptoms, Solid State Drive (SSD) capacity degradation, Solid State Drive (SSD) performance degradation, and Solid State Drive (SSD) failure, and Solid State Drive (SSD) functionality.

13. The system of claim 9, wherein the one or more processors executing the instructions stored in the system memory to derive a relationship between each of a plurality of observed factors and Solid State Drive (SSD) configuration comprises the one or more processors executing the instructions stored in the system memory to derive a relationship between two or more of: facility features of a physical facility for the data center, hardware features of hardware that is to interoperate with the one or more Solid State Drives (SSDs) within the data center, device features for the one or more Solid State Drives (SSDs), workload features of workloads using the one or more Solid State Drives (SSDs), environmental features of the environment within the data center, and policy features of management policies associated with the data center, and Solid State Drive (SSD) functionality.

14. The system of claim 9, wherein the one or more processors executing the instructions stored in the system memory to determine a Solid State Drive (SSD) optimization comprises the one or more processors executing the instructions stored in the system memory to predict one or more of: a probability of Solid State Drive (SSD) failure, a probability of Solid State Drive (SSD) capacity degradation, and a probability of Solid State Drive (SSD) performance degradation for the one or more Solid State Drives (SSDs) over a specified period of time operating within the data center.

15. The system of claim 9, wherein the one or more processors executing the instructions stored in the system memory to determine a Solid State Drive (SSD) optimization comprises the one or more processors executing the instructions stored in the system memory to optimize one or more of: a design decision for the one or more Solid State Drives (SSDs), a provisioning decision for the one or more Solid State Drives (SSDs), and an operational decision for the one or more Solid State Drives (SSDs).

16. The system of claim 9, wherein the one or more processors executing the instructions stored in the system memory to determine a Solid State Drive (SSD) optimization comprises the one or more processors executing the instructions stored in the system memory to determine an optimization for one or more of: a cooling type for the one or more Solid State Drives (SSDs), storage capacity for each of the one or more Solid State Drives (SSDs), or which model and vendor of Solid State Drive (SSD) to use.

17. The system of claim 9, wherein the one or more processors executing the instructions stored in the system memory to determine a Solid State Drive (SSD) optimization comprises the one or more processors executing the instructions stored in the system memory to determine an optimization for one or more of: lifetime for the one or more Solid State Drives (SSDs), reliability for the one or more Solid State Drives (SSDs), capacity degradation rate for the one or more Solid State Drives (SSDs), and operating performance for the one or more Solid State Drives (SSDs).

18. A computer program product for use at a computer system, the computer program product comprising one or more computer storage devices having stored thereon computer-executable instructions that, when executed at a processor, cause the computer system to implement a method, including the following:
receive a Solid State Drive (SSD) configuration indicating the configuration of one or more Solid State Drives (SSDs) within a data center;
observe a plurality of factors related to Solid State Drive (SSD) functionality in another data center;
derive a relationship between each of a plurality of observed factors and the Solid State Drive (SSD) configuration, each relationship quantifying a causal impact of a factor on Solid State Drive (SSD) reliability;
infer existence of at least one unobserved latent variable related to Solid State Drive (SSD) functionality based on the observed plurality of factors;

derive an additional relationship between the unobserved latent variable and the Solid State Drive (SSD) configuration quantifying an additional causal impact on Solid State Drive (SSD) reliability;

determine a Solid State Drive (SSD) optimization based on the Solid State Drive (SSD) configuration, data center factors for the data center, the derived relationships, and the derived additional relationship; and apply the optimization to the one or more Solid State Drives (SSDs) to optimize Solid State Drive (SSD) reliability at the data center.

19. The computer program product of claim 18, wherein computer-executable instructions that, when executed, cause the computer system to derive a relationship between each of a plurality of observed factors and Solid State Drive (SSD) configuration comprise computer-executable instructions that, when executed, cause the computer system to derive a relationship between two or more of: Solid State Drive (SSD) failure symptoms, Solid State Drive (SSD) capacity degradation, Solid State Drive (SSD) performance degradation, and Solid State Drive (SSD) failure, and Solid State Drive (SSD) functionality.

20. The computer program product of claim 18, wherein computer-executable instructions that, when executed, cause the computer system to determine a Solid State Drive (SSD) optimization comprise computer-executable instructions that, when executed, cause the computer system to determine how to optimize one or more of: lifetime for the one or more Solid State Drives (SSDs), reliability for the one or more Solid State Drives (SSDs), capacity degradation rate for the one or more Solid State Drives (SSDs), and operating performance for the one or more Solid State Drives (SSDs).

* * * * *